(12) United States Patent
Olson et al.

(10) Patent No.: US 6,224,117 B1
(45) Date of Patent: May 1, 2001

(54) CONTAMINANT RESISTANT TUBE FITTING

(75) Inventors: Darwin Olson, Franklin; Jerios Elchaer, Hermitage, both of TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/166,158

(22) Filed: Oct. 5, 1998

(51) Int. Cl.$^7$ .................................................. F16L 21/06
(52) U.S. Cl. .......................... 285/322; 285/331; 285/906
(58) Field of Search .................................. 285/322, 323, 285/331, 906, 242, 243

(56) References Cited

U.S. PATENT DOCUMENTS

| | | |
|---|---|---|
| 4,407,526 | 10/1983 | Cicenas . |
| 5,048,872 | * 9/1991 | Gehring ................................ 285/322 |
| 5,171,045 | 12/1992 | Pasbrig . |
| 5,205,594 | * 4/1993 | Stoll et al. .......................... 285/322 |
| 5,230,539 | 7/1993 | Olson . |
| 5,468,028 | 11/1995 | Olson . |
| 5,474,336 | 12/1995 | Hoff . |
| 5,673,945 | 10/1997 | Olson . |
| 5,681,061 | 10/1997 | Olson . |
| 5,683,120 | 11/1997 | Brock . |

FOREIGN PATENT DOCUMENTS

4108221 * 9/1992 (DE) ..................................... 285/322

* cited by examiner

Primary Examiner—Dave W. Arola
(74) Attorney, Agent, or Firm—Millen, White, Zelano & Branigan, P.C.

(57) ABSTRACT

In order to minimize opportunities for dirt, grime, moisture and adverse atmospheric conditions to enter a fitting for coupling a flexible plastic tubes in a quick connect-type coupling, a collet used within the coupling has a constant diameter boss at one end and slots splitting the collet into spring fingers, which slots do not extend into the boss. The collet is received within a bore in an annular body, wherein the bore includes a cylindrical surface that is substantially completely engaged by an outer cylindrical surface of the boss, with the end of the boss projecting from the body a substantial distance beyond the bore.

15 Claims, 2 Drawing Sheets

CONTAMINANT RESISTANT TUBE FITTING

FIELD OF THE INVENTION

The present invention relates to quick connect tube couplings, and more particularly, to improvements in configurations for such couplings.

BACKGROUND OF THE INVENTION

Tube couplings are used to connect flexible tubes in numerous fluid power and control systems. Each of the tubes require couplings to connect the ends of the tube to bodies which, for example, may be conventional fittings, valves, manifolds or similar devices for transmitting and receiving pressurized air. In the past, connecting and disconnecting tubes was a time-consuming and therefore expensive task frequently performed in the field where specialized tools may not have been readily available. To solve this problem a wide variety of "push-to-connect" type couplings have been developed which permit a tube to be quickly and easily connected or disconnected without the use of tools. With these couplings, a tube is connected by simply press-fitting a coupling into a bore and then inserting the leading end of the tube into the coupling. Typically, the coupling contains a plurality of components which releasably or permanently retain the tube therein.

Quick-connect couplings are widely used in the trucking industry for fittings in and on cabs, so that pressurized air in the cab can be transmitted for numerous purposes. Fittings used outside of the cab on the chassis of the cab are subject to environmental degradation due to dirt, grime, moisture and atmospheric conditions which are not present within the passenger compartment of the cab. To date, failure of these fittings in the field has not occurred; however, there is a need to address this concern by improving the fittings so that the effects of adverse environment conditions are minimized, thus minimizing the risk of failures in the future.

SUMMARY OF THE INVENTION

It is a feature of the present invention to provide a new and improved coupling for connecting a tube to a body member, wherein the effects of adverse environmental conditions are minimized.

In view of this feature, and other features, the present invention is directed to a coupling using a collet in which the collet has an end boss and longitudinally extending slots which are axially displaced from the end boss. According to the invention, the end boss has a diameter complementing the diameter of the bore into which the collet is received. The slots and end boss minimize access of dirt, grime and moisture through the collet into the interior of the coupling.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
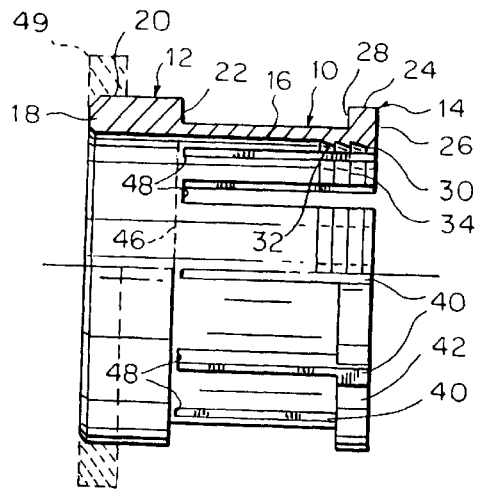
FIG. 1 is a side view partially in elevation of a collet configured in accordance with the present invention.
Figure 2:
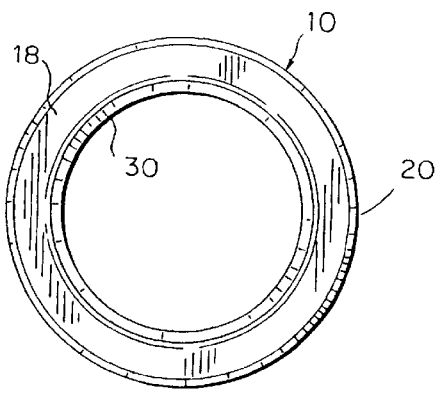
FIG. 2 is an end view of a first end of the collet of FIG. 1.
Figure 3:
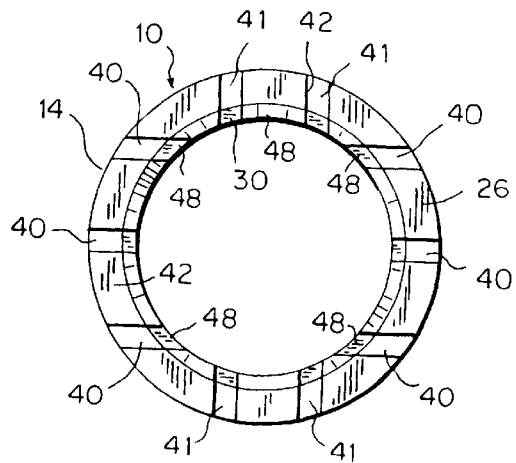
FIG. 3 is an end view of a second end of the collet of FIGS. 1 and 2.

Referring first to FIGS. 1–3, there is shown a collet 10 configured in accordance with the principles of the present invention. The collet 10 includes a first end 12 and a second end 14 connected by a cylindrical barrel portion 16. The first end 12 includes a boss 18 which has an axially extending cylindrical surface 20 and a radially extending shoulder 22. Preferably, a second larger cylindrical barrel portion may be included. The second end 14 includes a thick flange 24 which has an end 26 and an abrupt shoulder 28. A plurality of annular barbs 30, preferably three in number, are positioned adjacent the second end 14 and have leading ramp portions 32 and shoulders 34 for retaining a plastic tube, as will be explained hereinafter.

Collet 10 includes a plurality of first slots 40, and second slots 41 preferably eight in number, to divide the barrel 16 into an array of eight spring arms 42. The slots 40 and 41 extend from the second end 14 of the collet 10 back to a location 46 proximate the shoulder 22 of the boss 18. The slots 40 do not extend into the boss 18, but are rather limited to the barrel portion 16 and the second end 14 of the collet 10 with ends 48 that terminate just before reaching the boss 18. The first slots 40 provide a first group of slots which extend parallel to one another while the second slots 41 provide a second group of slots which extend perpendicular to the first group of slots. As will be explained hereinafter, the spring arms 42 deflect inwardly when assembling the collet with the annular body shown in FIGS. 4–6, while the boss 18 is received within the annular body. By so configuring the collet 10, the collet cooperates with the annular body to minimize the introduction of environmental debris and moisture into the fitting with which it is used.

Figure 4:
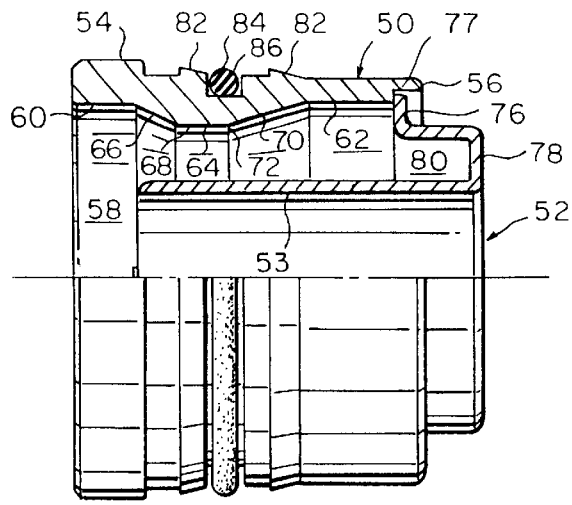
FIG. 4 is a side view, partially in elevation, showing an annular body of a fitting which receives the collet of FIGS. 1–3 with the collet and an O-ring removed to facilitate a clear description of its structure.

Referring now to FIG. 4, there is shown the annular body, an annular body 50, which receives the collet 10. The annular body 50 has a tube support 52 retained therein, which tube support having a tubular portion 53 is received within a plastic tube, as will be explained hereinafter. The annular body 50 has a first end 54, a second end 56 and defines a bore 58. The first end 54 of the annular body 50 has a first interior cylindrical surface 60 adjacent thereto which extends into the bore 58 and a second cylindrical surface 62 which is adjacent the second end 56 of the annular body. Disposed between the first cylindrical surface 60 and the second cylindrical surface 62 is an inwardly extending stop 64. The inwardly extending stop 64 has a first frustoconical surface 66, a cylindrical surface 68 and a second frustoconical surface 70. The second frustoconical surface 70 joins the cylindrical surface 68 with a step 72.

The tube support 52 is retained at the second end 56 of the annular body 50 by a radially extending flange 76 which projects from a U-shaped portion 78 of the tube support. The radial flange 76 abuts a radial shoulder 77 at the second end 56 of the annular body 50. U-shaped portion 78 defines an annular space 80 which, as explained hereinafter, receives an end of a tube inserted therein. In order to secure the tube support 52 within the annular body 50, the second end 56 of the annular body is coined over the radial flange 76 or, alternatively, may be staked over the radial flange 76.

In the illustrated embodiments, the annular body 50 has a pair of external, outwardly projecting barbs 82 between which is located a groove 84 that receives an O-ring 86.

Figure 5:
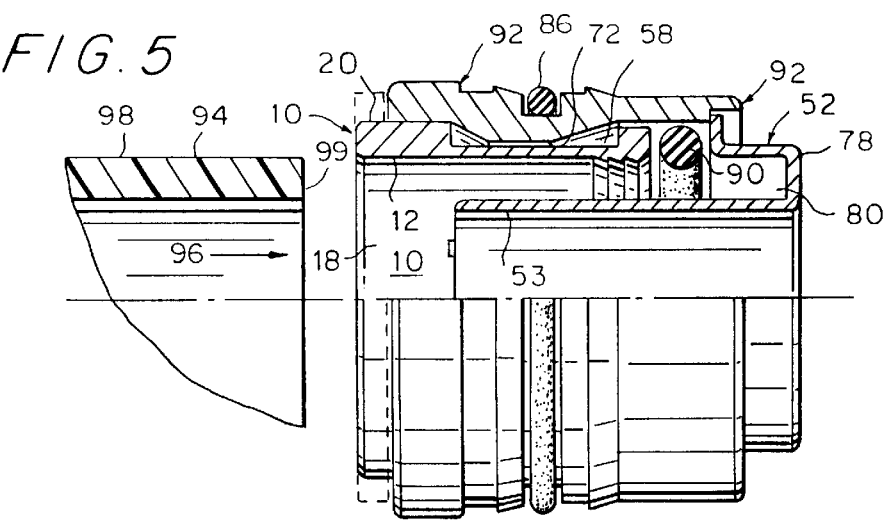
FIG. 5 is a view similar to FIG. 4, but showing the collet and O-ring positioned within the annular body and a tube aligned therewith for insertion into the fitting.

Referring now to FIG. 5, the collet 10 is inserted into the bore 58 of the annular body member 50, along with an internal O-ring 90, to provide an assembled fitting 92. The fitting 92 receives a flexible plastic tube 94 which is slid into the fitting in an axial direction 96. The tubuler tube 94 has a cylindrical inner wall surface 96 which receives the tube support 52 and cylindrical outer wall surface 98 which slides within the collet 10 until the end 99 of the tube 94 seats in the annular space 80 of the bite 78.

Figure 6:
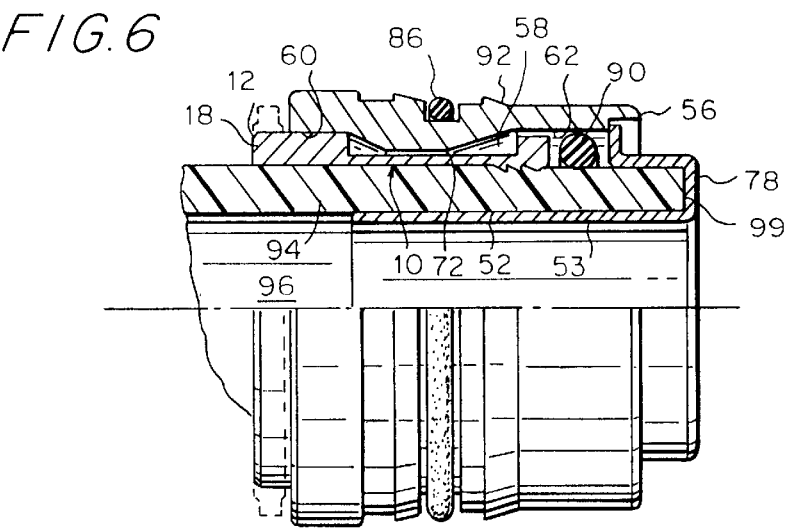
FIG. 6 is a view similar to FIG. 5, but showing the tube inserted into the fitting.

As is seen in FIG. 6, the annular barbs 30 on the collet 10 bite into the exterior cylindrical surface 98 of the tube 94 to retain the tube within the fitting. The O-ring 90 is deformed by the tube so as to seal between the tube and the second cylindrical surface 62 of the annular body 50. Since the slots 40 are inboard of the boss 18 and the boss engages the cylindrical surface 60 over substantially the entire length of the cylindrical surface 60, the opportunity for dirt, grime, and moisture, to enter the fitting 92 is minimized. Moreover, atmospheric conditions and contaminants are substantially precluded from access to the system associated with and connected to the tube 94 and fitting 92.

In that the typical truck cab includes numerous tubes 94 and fittings 92 of various sizes, typically ⅛ inch to ¾ inch, some of which are mounted on the cab chassis outside of the cab, configuring the collet 18 so as to fit within the fitting 92, according to this invention, minimizes the chance that pneumatic systems of devices will become damaged or compromised due to environmental conditions. Moreover, since the slots 40 terminate prior to the boss 18, instead of extending therethrough, the collet 10 is more robust than those of the prior art so that the chances of the collet being damaged during assembly and fabrication are greatly reduced.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A collet for a coupling, wherein the coupling has a body with a bore therein for receiving a tube, the body bore having a frustoconical surface therein intermediate the length thereof, the body having a tube support fixed therein to prevent movement in an axial direction with respect to the body, the tube support having a tubular portion which receives the tube thereover and the bore of the body having a first end with a first cylindrical surface of a selected axial length, the collet comprising:

a first end and a second end;

the first end having a cylindrical barrel portion defining boss of a constant diameter extending axially with respect to the collet by a length greater than the selected axial length of the first cylindrical surface of the bore and projecting radially from the collet to define a shoulder, the barrel portion being adapted to receive the tube therein to hold the tube against the tubular portion of the tube support;

a plurality of spring arms cantilevered adjacent the shoulder and defined by slots in the collet which extend through the second end of the collet and terminate before the shoulder of the boss;

at least one barb located on each spring arm proximate the second end of the collet adapted to engage the tube lo retain the tube in the body, and flanges projecting radially outwardly from the spring arms, the flanges being adapted to engage the frustoconical surface in the bore of the body to press the spring arms against the tube to prevent retraction of the tube from the collet and therefore from the body.

2. The collet of claim 1, wherein there are eight spring arms.

3. The collet of claim 1, wherein a flange is disposed at the second end of the collet.

4. The collet of claim 1, wherein there are a plurality of barbs, the barbs being annular and interrupted by the slots.

5. The collet of claim 1, wherein the collet is made of metal.

6. The collet of claim 1 wherein a first group of the slots defining the spring arms extend in one direction parallel to one another and wherein a second group of the slots extend perpendicular to the first group.

7. A coupling for connecting a body to a tube comprising:

a bore formed in the body, the bore having a first end and a second end, a first inwardly facing cylindrical surface adjacent to the first end of the bore, a second cylindrical surface adjacent to the second end of the bore and an inwardly extending stop disposed between the first and second cylindrical surfaces;

a tube support having a first end within the bore in radial spaced relation to the first and second cylindrical surfaces and the inwardly extending stop, the tube support having a second end fixed at the second end of the bore;

a seal disposed within the bore in radial spaced relation with the tube support, the seal being adapted to seal with the tube; and a collet received within the bore in spaced relation to the tube support, the collet defining a cylindrical space adapted to receive a tube having a first end and a second end, and the collet comprising:

an outwardly extending radial boss at the first end, the outwardly extending boss having an axially extending outwardly facing cylindrical surface of a diameter complementing the diameter of the inwardly facing cylindrical surface of the bore, wherein the outwardly extending boss slides into the first cylindrical inwardly facing surface in substantial contact therewith, the radial boss having a length greater than the length of the inwardly facing cylindrical surface so as to project therefrom upon engaging the inwardly extending stop;

a barrel portion extending from the boss to an end flanges at the second end of the collet, the barrel portion having an outer diameter less than the diameter of the inwardly extending stop and at least one annular tooth adapted to engage the tube to retain the tube within the coupling with the tube support;

a plurality of axially extending slots extending in the barrel portion through the second end of the collet and terminating before the boss to divide the barrel portion into a plurality of longitudinally extending spring arms, and outwardly extending flanges at the second end of the collet for engaging the inwardly extending stop in the bore to prevent axial dislodgement of the collet and tube engaged by the collet from the bore.

8. The coupling of claim 7, wherein the inwardly extending stop comprises a first frustoconical wall facing the first end of the bore for limiting axial movement of the collet into the bore.

9. The coupling of claim 8, wherein the inwardly extending stop further includes a second frustoconical wall facing the second end of the bore for engaging the flange at the second end of the collet for limiting axial movement of the collet out of the bore.

10. The coupling of claim 8, wherein the first and second frustoconical walls are joined by a cylindrical wall which is stepped with respect to the second frustoconical wall to provide an abrupt stop for the flange when the collet is pulled from the bore.

11. The coupling of claim 10, wherein the collet has a plurality of annular teeth.

12. The collet of claim 7, wherein the collet is made of metal.

13. The coupling of claim 7, wherein the body comprises an annular fitting with external projections for retaining the fitting in a support.

14. The coupling of claim 13, wherein the projections are annular barbs.

15. The coupling of claim 7, wherein the tube is plastic and the collet is metal.

* * * * *